(12) United States Patent
Cerdan

(10) Patent No.: US 10,562,587 B2
(45) Date of Patent: Feb. 18, 2020

(54) CYCLE CRANKSET WITH SELF-POSITIONED FLOATING CHAINRING

(71) Applicant: Jacques Cerdan, Sully sur Loire (FR)

(72) Inventor: Jacques Cerdan, Sully sur Loire (FR)

(73) Assignee: C3B, Marseilles (FR)

( * ) Notice: Subject to any disclaimer, the term of this patent is extended or adjusted under 35 U.S.C. 154(b) by 0 days.

(21) Appl. No.: 16/091,218

(22) PCT Filed: Apr. 4, 2017

(86) PCT No.: PCT/EP2017/058043
§ 371 (c)(1),
(2) Date: Oct. 4, 2018

(87) PCT Pub. No.: WO2017/174617
PCT Pub. Date: Oct. 12, 2017

(65) Prior Publication Data
US 2019/0111996 A1  Apr. 18, 2019

(30) Foreign Application Priority Data

Apr. 4, 2016 (FR) .................................. 16 00572
Oct. 4, 2016 (FR) .................................. 16 01443

(51) Int. Cl.
B62M 3/00    (2006.01)
B62M 9/06    (2006.01)
B62M 3/06    (2006.01)
B62M 9/08    (2006.01)

(52) U.S. Cl.
CPC .............. B62M 3/06 (2013.01); B62M 9/085 (2013.01); B62M 2003/006 (2013.01)

(58) Field of Classification Search
CPC .......... B62M 3/00; B62M 3/003; B62M 3/06; B62M 9/08; B62M 9/085; B62M 2003/006
See application file for complete search history.

(56) References Cited

U.S. PATENT DOCUMENTS 4,218,931 A * 8/1980 Tritenne ................... B62M 1/36
                                                474/160
4,309,043 A    1/1982 Brown
(Continued)

FOREIGN PATENT DOCUMENTS

CN    1200342 A    12/1998
FR    2584671 A1   1/1987
(Continued)

OTHER PUBLICATIONS

PCT Search Report; priority document.

Primary Examiner — Adam D Rogers
(74) Attorney, Agent, or Firm — Greer, Burns & Crain, Ltd.

(57) ABSTRACT

A cycle crankset, comprising independent cranks articulated around a crank axis and each having a pedal axis, a cam pivotably mounted about the crank axis, and a chainring assembly pivotably mounted about the cam about an axis parallel to the crank axis, the cranks being connected to the chainring assembly via connecting rods, the articulation point between each of the cranks and one of the connecting rods being located on the portion of the crank opposite the pedal axis relative to the crank axis.

8 Claims, 5 Drawing Sheets

(56) References Cited

U.S. PATENT DOCUMENTS

| | | | | |
|---|---|---|---|---|
| 5,044,226 A * | 9/1991 | Wu | ............... | B62M 3/06 |
| | | | | 74/594.1 |
| 5,067,370 A * | 11/1991 | Lemmens | ............... | B62M 9/08 |
| | | | | 474/152 |
| 5,442,972 A | 8/1995 | Hoover | | |
| 6,085,613 A * | 7/2000 | Niculescu | ............... | B62M 1/36 |
| | | | | 280/259 |
| 6,367,352 B1 | 4/2002 | Niculescu | | |
| 2004/0045401 A1 | 3/2004 | Carrasco | | |

FOREIGN PATENT DOCUMENTS

| | | | | |
|---|---|---|---|---|
| FR | 2742408 A1 | 6/1997 | | |
| WO | WO-9720726 A1 * | 6/1997 | ............... | B62M 1/36 |

* cited by examiner

Section A

CYCLE CRANKSET WITH SELF-POSITIONED FLOATING CHAINRING

CROSS-REFERENCES TO RELATED APPLICATIONS

This application claims the benefit of the International Application No. PCT/EP2017/058043, filed on Apr. 4, 2017, and of the French patent application No. 1600572, filed on Apr. 4, 2016, and of the French patent application No. 1601443 filed, on Oct. 4, 2016, the entire disclosures of which are incorporated herein by way of reference.

FIELD OF THE INVENTION

This invention relates to the crankset of a pedal operated vehicle. Its applications are particularly advantageous in, but not limited to, the field of bicycles or other cycles and similar devices. In the context of the invention, the term bicycle must be understood in its most general sense. It includes, in particular, the bicycle per se, racing bike, tricycle, quadricycle, mountain bike, pedal boat, and wheelchair for persons with reduced mobility. In general, the invention applies to any type of vehicle or machine moved by a mechanism involving a pedal, whether for adults or children (toy). For the sake of clarity, the following will be applied in the case of the preferred application of the invention, namely a conventional bicycle, without this in any way limiting the scope of the invention.

BACKGROUND OF THE INVENTION

Currently, cranksets comprise at least one chainring with ring gear which is secured in rotation with a shaft rotating about a fixed pedal axis and which drives a chain. The latter in turn drives a sprocket, secured to a rotation shaft of the rear wheel. This sprocket is not necessarily unique, it may consist of derailleur gears equipped with several sprockets of different ratios to adapt to the terrain configurations. The chainring is secured to two cranks symmetrically located on either side of the bicycle frame and offset from each other by 180°. The free ends of the cranks are fitted with a screw thread for attaching a pedal free to rotate about a connecting axis. As a result, by exerting pushing force on the pedals, the cyclist rotates the chainring which in turn drives the rear wheel by means of the chain. This type of crankset has disadvantages, the main one is due to the symmetrical configuration of the cranks which have their longitudinal axes aligned. In particular, when one of the pedals is in the low position (bottom dead center: BDC), its opposite is in the up position (top dead center: TDC). If the cyclist pushes down on the pedal in this position, this thrust is clearly ineffective since there is no force component to rotate the cranks.

In the state of the art, there are different solutions to facilitate the passage of the top dead center (TDC). The most relevant systems use independent cranks and a chainring decentered by a cam. Connecting rods provide the connection between the cranks and the chainring. This is described, for example, in patent FR 2 584 671, in patent application FR 2 742 408 A1, in application US 2004/045401 A1 or in U.S. Pat. No. 6,367,352 B1.

In these mechanisms, there are disadvantages due to geometry. The articulation axis on the crank which controls the rotation of the chainring is located between the pedal axis and the crank axis. This configuration requires, for the removal of the dead center, a forward decentering of the chainring in a position that is not stable. The traction of the chain on the crankset tends to bring the decentering cam backwards. It is therefore necessary to provide a system for maintaining the cam in its forward decentering position. Additionally, the chain is extended by this forward decentering which causes an increase in the weight of the cycle.

SUMMARY OF THE INVENTION

The crankset according to the invention overcomes these disadvantages. It uses independent cranks for the right pedal and for the left pedal, articulated around a crank axis, and a chainring decentered by a cam pivotably mounted about the crank axis, the chainring being pivotably mounted on the cam around an axis parallel to the crank axis.

The novelty of the invention is due to the fact that the articulation between the crank and the rod controlling the rotation of the chainring is located on the crank in the zone situated opposite the pedal axis, with respect to the crank axis.

This configuration determines, when force is applied to the crank, an orientation of the decentering of the cam to the rear to obtain the removal of the dead center. The traction of the chain on the crankset tending to decenter the cam to the rear, the cam therefore naturally takes the position that avoids dead centers, without it being necessary to fix its position.

Furthermore, the orientation of the decentering of the cam to the rear slightly reduces the length of the chain and therefore the weight of the cycle.

The invention relates, more specifically, to a cycle crankset as defined by the claims.

BRIEF DESCRIPTION OF THE DRAWINGS

The accompanying drawings illustrate embodiments of the invention.

DETAILED DESCRIPTION OF THE PREFERRED EMBODIMENTS

First Embodiment

Figure 1:
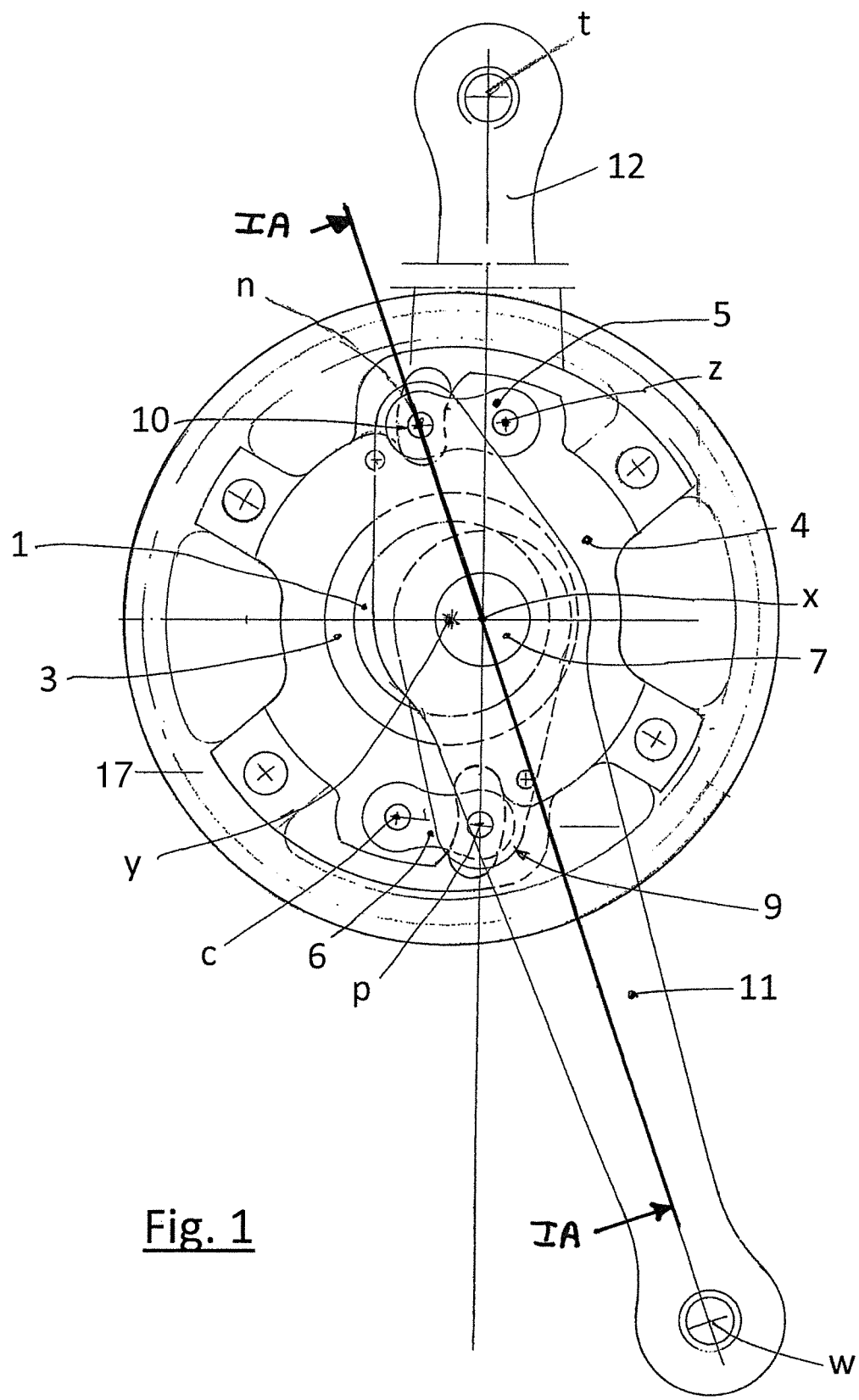
FIG. 1 shows a side view of a crankset according to a first embodiment.
Figure 1A:
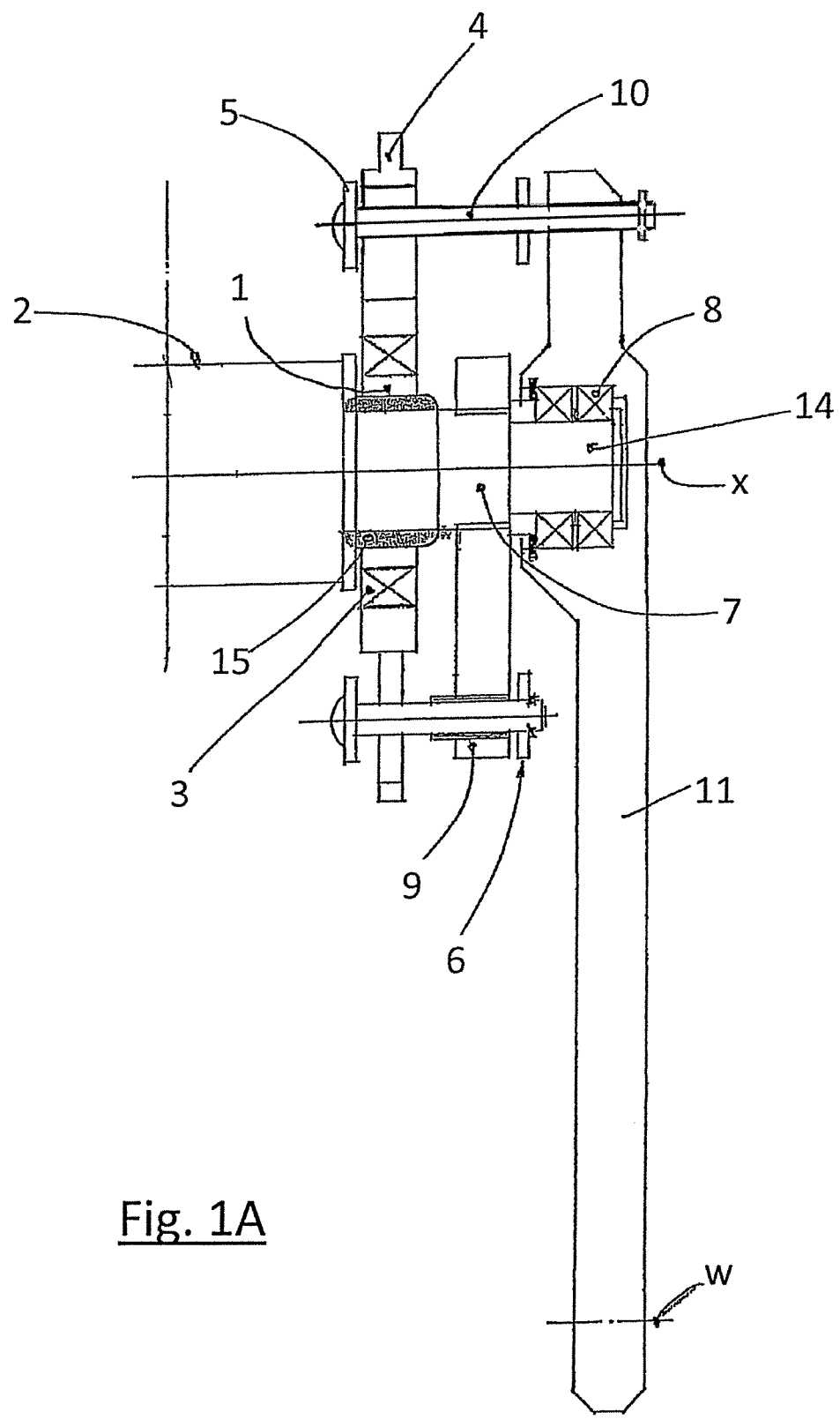
FIG. 1A shows a sectional view of the crankset in FIG. 1.

FIGS. 1 and 1A show a cycle crankset, according to a first embodiment of the invention.

This crankset comprises two independent cranks, a right crank 11 and a left crank 12, which are pivotably mounted around an axis x hereinafter called the "crank axis". Left crank 12 is mounted, conventionally, secured to the left end of a shaft, or axis 7, which is pivotably mounted along crank axis x, in cycle housing 2. Right crank 11 is pivotably assembled at the right end of shaft 7, via a crank pin 14, screwed onto the end of axis 7, on which are mounted two ball bearings 8 supporting crank 11 and allowing it to swivel around axis x.

Right crank 11 supports, near its free end, a pedal (not shown) articulated on pedal axis w. Crank 12 supports, near its free end, a pedal (not shown) articulated on pedal axis t.

The crankset also includes a half-crank 9, integrally assembled to axis 7 of the right side of housing 2. This half-crank 9 is secured to axis 7, in rotation, by longitudinal grooves provided on axis 7. This half-crank 9 is thus pivotable around axis x, integrally with axis 7 and with left crank 12. The assembly formed by left crank 12, axis 7 and half-crank 9 is hereinafter called the "left crank assembly". It will also be considered that, from a kinematic point of view, axis 7 and half-crank 9 form a portion of the left crank. Half-crank 9 is therefore the portion of left crank 12 opposite pedal axis t with respect to crank axis x.

This crankset further comprises a cam 1, or decentering cam, having an inner cylindrical surface, centered on crank axis x, and an outer cylindrical surface, centered on axis y parallel to axis x. This cam 1 is mounted articulated on axis 7, at the output to the right of housing 2, thanks to a needle bearing 15 placed on axis 7 and supporting the inner cylindrical surface of cam 1. Cam 1 is pivotally mounted around axis x.

The outer cylindrical surface, or outer diameter of cam 1 concentric with axis y, supports a ball bearing 3 on which is mounted a chainring holder 4 on which is mounted a chainring 17. The assembly formed by chainring holder 4 and the chainring is hereinafter called the "chainring assembly". This chainring assembly is pivotably mounted on cam 1, around axis y. It should be noted that cam 1, and therefore axis y, being pivotable around crank axis x, the chainring assembly is therefore movably mounted, or floating. If the pivoting of cam 1 is not blocked, the position of the chainring assembly may vary during pedaling, allowing it to self-position.

It should be noted that, according to variants of this embodiment, the chainring assembly may comprise a plurality of chainrings mounted on a chainring holder. This assembly can also be constituted by a single chainring directly pivoted around cam 1.

A first connecting rod 5 is articulated at point n on right crank 11 and at point z on chainring holder 4, or more generally on the chainring assembly. It thus ensures the connection between right crank 11 and the chainring assembly. A second connecting rod 6 is articulated at point p on half-crank 9 and at point c on chainring holder 4, or more generally on the chainring assembly. It thus ensures the connection between the left crank assembly and the chainring assembly.

In the embodiment shown in FIG. 1, articulation point n between crank 11 and connecting rod 5 (constituted by stem 10) is located on crank n on the extension of the line, hereinafter called the reference line, passing through the pedal axis w and crank axis x, and opposite pedal axis w, relative to crank axis x.

In the same way, on the left crank assembly, articulation point p between half-crank 9 and connecting rod 6 is located, in the plane passing through pedal axis t and crank axis x, opposite pedal axis t with respect to crank axis x.

Second Embodiment

Figure 2:
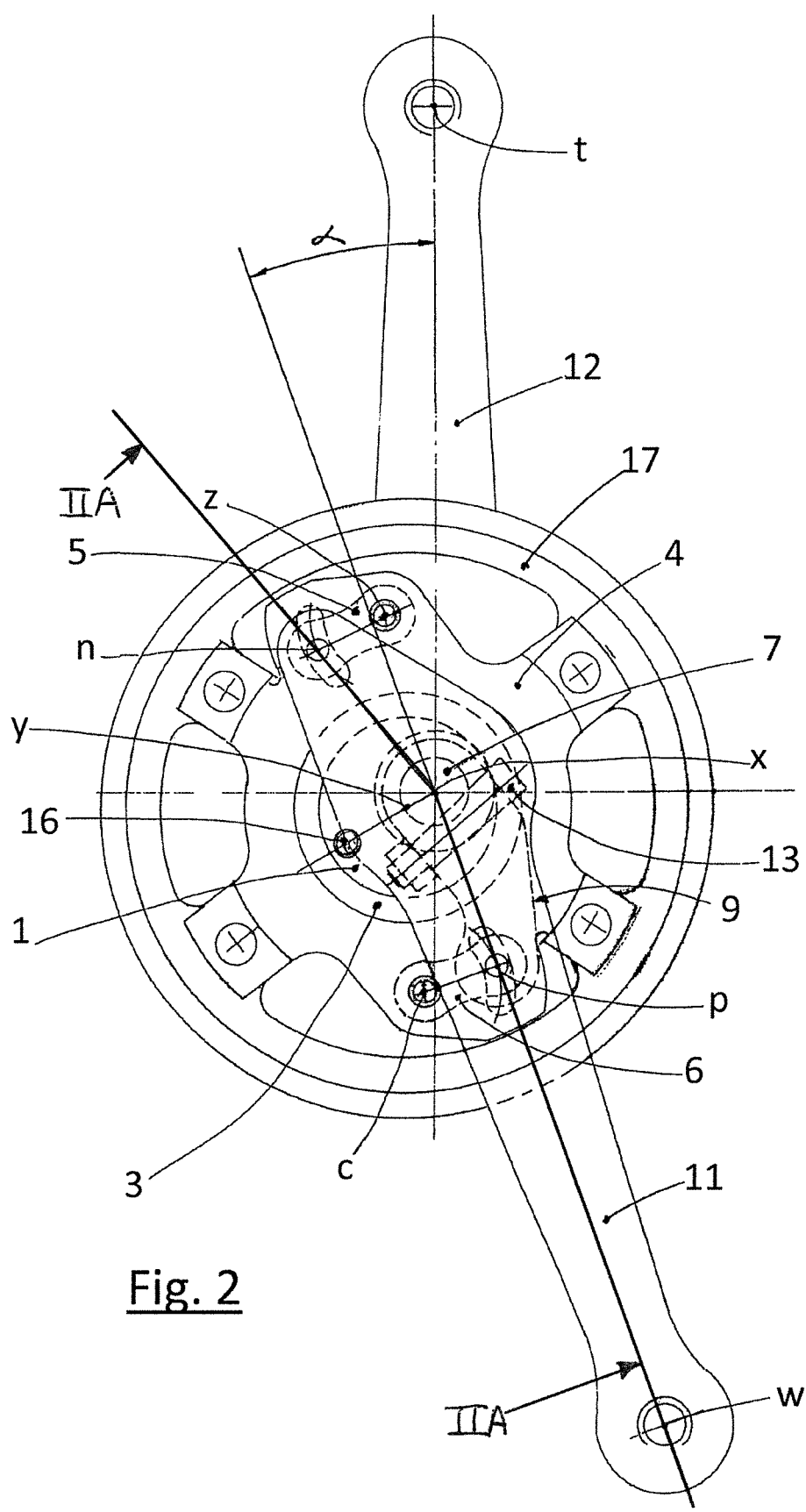
FIG. 2 shows a side view of a crankset according to a second embodiment.
Figure 2A:
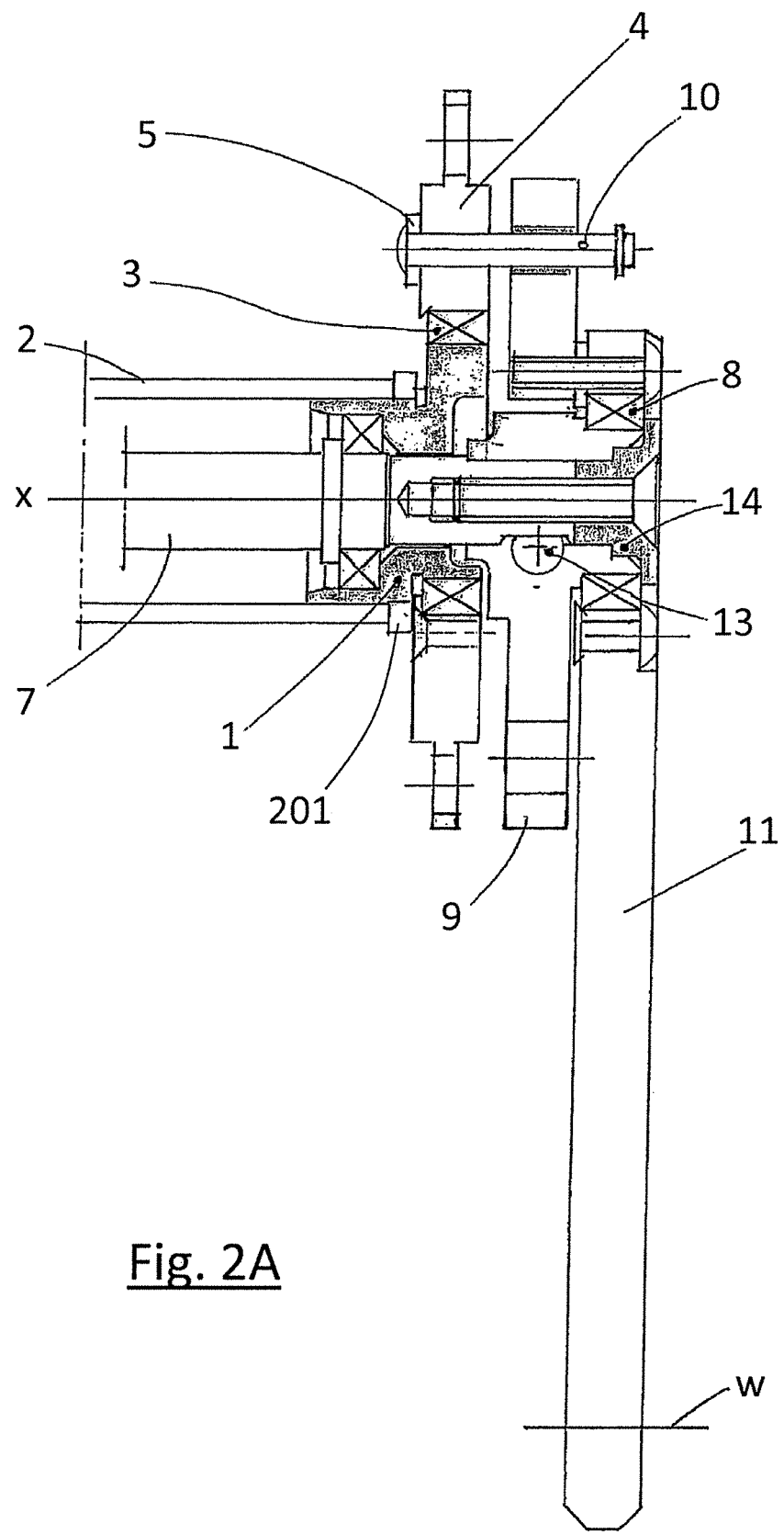
FIG. 2A shows a sectional view of the crankset in FIG. 2.

FIGS. 2 and 2A show a crankset according to a second embodiment of the invention. In this embodiment, many elements of the crankset are identical or similar to the crankset of the first embodiment. These elements bear the same references as in the first embodiment, and their descriptions are not repeated.

In the variant represented by these figures, cam 1 has a threaded portion 1A, screwed into cycle housing 2. In this embodiment, the cam is pivotally mounted around axis x via this thread. It can turn freely, screwing or unscrewing, if the threaded portion 1A is not blocked. However, it is also possible to block its pivoting by tightening against housing 2 a lock nut 201 screwed onto the thread 1A of cam 1. This lock nut 201 is, in this case, a means of limiting the pivoting of cam 1 around crank axis x.

In this embodiment, point of articulation n between crank 11 and connecting rod 5 is offset relative to the reference line passing through pedal axis w and crank axis x.

This articulation point n remains, on crank 11, in the portion of the crank opposite pedal axis w, with respect to crank axis x. Thus, if it is considered that right crank 11 is separated into two parts by a plane, called the transverse plane, passing through crank axis x and perpendicular to the plane passing through crank axis x and pedal axis w, articulation point n and pedal axis w are located on the crank, each on one side of the transverse plane.

Similarly, point of articulation p between half-crank 9 and connecting rod 6 is shifted relative to the plane passing through pedal axis t of left crank 12 and crank axis x. Articulation point p remains, on the left crank assembly comprising left crank 12, axis 7 and half-crank 9, in the portion opposite pedal axis t, relative to crank axis x. Thus, if it is considered that the left crank assembly is separated into two parts by a plane, called the transverse plane, passing through crank axis x and perpendicular to the plane passing through crank axis x and pedal axis t, articulation point p and pedal axis t are located on this assembly, each on one side of the transverse plane.

This offsetting of the position of articulation point n, or articulation point p, advantageously allows one to slightly modify the application of force on the crankset. It may, for example, make it possible to better match the direction of the force exerted on cam 1 with the position of this cam 1 which effectively avoids dead center positions.

Decentering cam 1 is pivotably mounted on axis 7. In certain configurations, it is possible to allow this cam 1 to pivot freely, for example so that this cam self-positions under the effect of pedaling, or naturally takes its ideal position to avoid dead center positions. In other cases it may be advantageous for the cam to pivot slightly during pedaling, for example by oscillating slightly around an equilibrium position. In yet other cases, it may be useful to limit this pivoting or to block it. Such a limitation of pivoting can be obtained by various means, for example by a stop 16, fixed on cam 1 and resting upon part of the cycle. Cam 1 may have several locations to fix such a stop at different positions.

Depending on the position of stop 16, it can limit the pivoting of cam 1 to a desired angular range. It is also possible to place this stop, or several stops, so as to completely block the pivoting of cam 1. In this case, cam 1 can be stopped with one or more stops at the position determined by pedaling. It may also be decided to maintain the cam at another position, for different reasons, such as a change in the dead center offset, or an adjustment to the cyclist's morphology, or to adapt to different conditions of use. It is also possible, when two stops are provided, that these stops are flexible to allow a slight oscillation of cam 1.

In the embodiment of FIGS. 2 and 2A, the fixed mounting of half-crank 9 on axis 7 is achieved by means of a key 13. A person skilled in the art will of course be able to adapt the most suitable attachment method of the half-crank for each of the embodiments of the invention.

Third Embodiment

Figures 3, 3A:
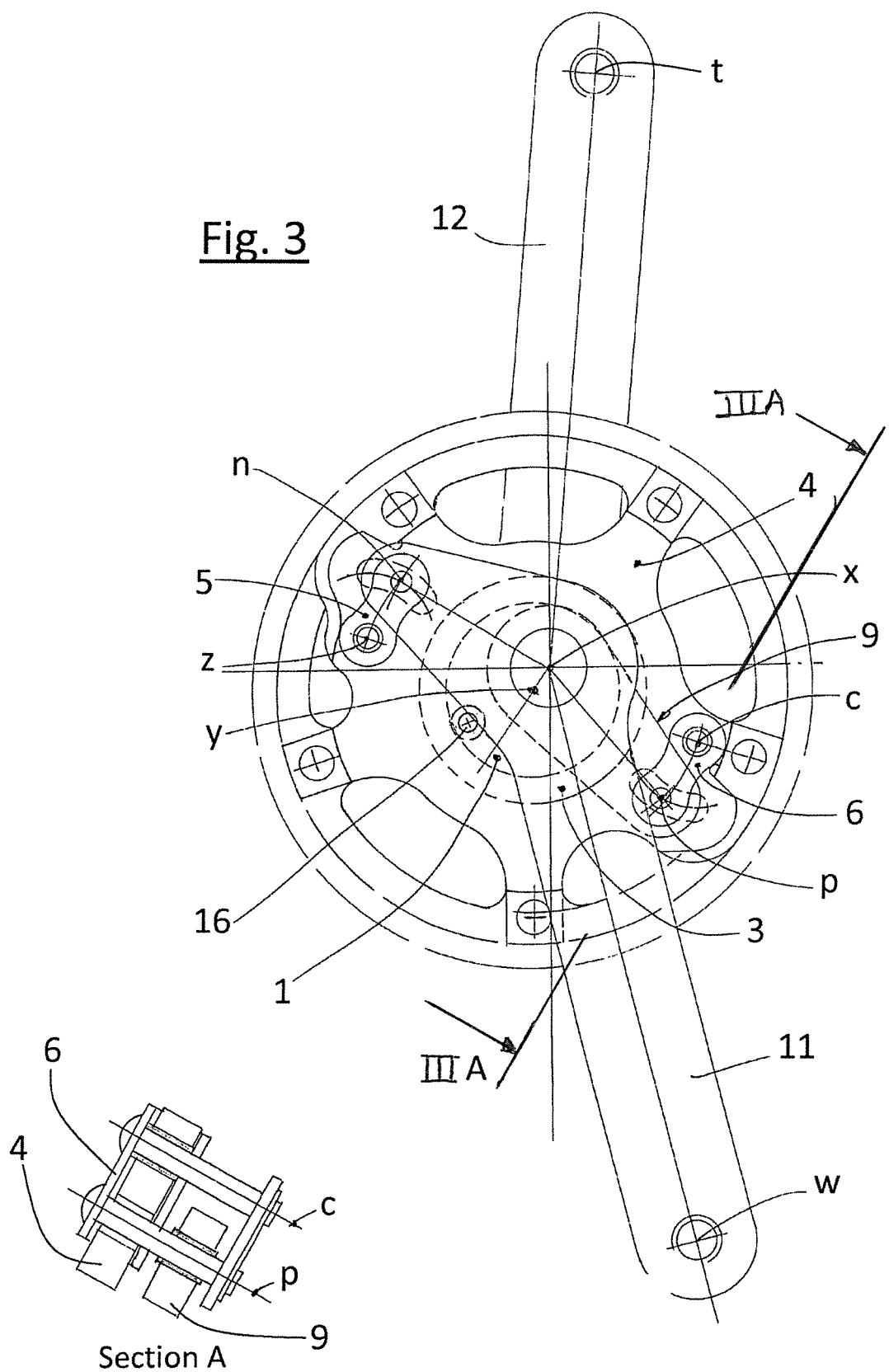
FIG. 3 shows a side view of a crankset according to a third embodiment.
FIG. 3A shows a sectional view of the crankset in FIG. 3.

FIGS. 3 and 3A show a crankset according to a third embodiment of the invention. In this embodiment, many elements of the crankset are identical or similar to the crankset of the first or second embodiment. These elements bear the same references as in the first or second embodiment, and their descriptions are not repeated.

According to this particularly advantageous solution, represented by FIG. 3, the angle formed between the radius passing through crank axis x and articulation n, on the one hand, and the reference line passing through pedal axis w and the crank axis, on the other, is approximately 45°. In this case, advantageously, the x-y decentering line, which is representative of the angular position of cam 1 around axis x, is automatically positioned at the position most suited to performance.

The angular position of the cam is induced by the force component applied on the crank and the subsequent force of the chain reaction.

In the same way, in the left crank assembly, the angle formed between the plane passing through crank axis x and articulation p, on the one hand, and the plane passing through pedal axis t and crank axis x, on the other, is approximately 45°.

The value of the 45° angle is not limiting, it can vary from 0 to 90° on either side of the reference axis, passing through crank axis x and pedal axis w. Thus articulation n, or articulation p, respectively, can be placed on right crank 11, or on the left crank assembly, respectively, at any point of the portion of this crank, or of this crank assembly, which is opposite the pedal axis, relative to the crank axis.

In the embodiment shown in FIG. 3, connecting rods 5 and 6 are placed between the cranks and the chainring assembly, so as to pull the chainring assembly during pedaling. In other words, these connecting rods are placed so as to be stressed in tension, unlike the embodiments shown in FIGS. 1 and 2, wherein connecting rods 5 and 6 are placed so as to be stressed in compression. In general, a person skilled in the art can choose any of the solutions.

FIG. 3A represents a partial section of the crankset of FIG. 3, passing through axes p and c of connecting rod 6. In this embodiment, connecting rod 6 is constituted by a chain pin, comprising a first stem along the axis c which is pivotably mounted in chainring holder 4 by means of a plain bearing, and a second stem, according to axis p, which is pivotably mounted in half-crank 9 with a plain bearing. This second stem passes through chainring holder 4 passing through a light adapted to allow connecting rod 6 to move. In other possible embodiments, connecting rods 5 and 6 may be chain links. Likewise, plain bearings can be replaced by ball bearings.

Advantageously, the crankset according to the invention may comprise a protective casing, and possibly an oil reserve for lubricating the mechanisms.

According to an advantageous characteristic, the crankset according to the invention can be used with ovoid or oval chainrings, which are familiar to persons skilled in the art. Such chainrings allow a control-gearing ratio of the force different depending on the angular position of the chainring. The mounting of such a chainring on the crankset of the invention, for example offset by 90° from its usual mounting position on conventional cranks, can reduce or eliminate lever arm modifications according to the position of the pedals which is induced by the crankset according to the invention.

In general, a person skilled in the art can easily combine the features presented in the various embodiments of the present application, without departing from the scope of the invention.

The crankset according to the invention is particularly intended to be fitted on cycles in order to improve the performance thereof. Cycles include racing bikes, touring bikes, mountain bikes, electric bikes, bikes for the disabled, recumbent bikes, etc.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cycle crankset for a cycle, comprising:
   independent cranks articulated around a crank axis and each with a pedal axis,
   a cam pivotably mounted about said crank axis, and
   a chainring assembly pivotably mounted about the cam, about an axis parallel to the crank axis,
   the independent cranks being connected at articulation points to the chainring assembly via connecting rods,
   each articulation point between one of said independent cranks and one of said connecting rods being located on a portion of the independent crank opposite the pedal axis relative to the crank axis, wherein the articulation points that are manipulated by the left crank arm assembly are on the opposite side of the crank axis from the left pedal axis, and the articulation points that are manipulated by the right crank arm assembly are on the opposite side of the crank axis from the right pedal axis.

2. The cycle crankset according to claim 1, wherein said articulation point between one of said independent cranks and one of said connecting rods is located on each of said independent cranks in a plane passing through the crank axis and forming an angle between 0 and 90° with a plane passing through the pedal axis and the crank axis.

3. The cycle crankset according to claim 1, wherein said articulation point between one of said independent cranks and one of said connecting rods is located on each of said independent cranks in a plane passing through the pedal axis and the crank axis.

4. The cycle crankset according to claim 1, wherein the pivoting of said cam around the crank axis is limited by at least one stop.

5. The cycle crankset according to claim 4, wherein the pivoting of said cam is limited by said at least one stop to a desired angular range.

6. The cycle crankset according to claim 5, wherein the limitation of the pivoting of said cam is obtained by said at least one stop positioned on said cam and configured to rest on part of the cycle.

7. The cycle crankset according to claim 1 wherein the cam is left free to pivot about said crank axis.

8. The cycle crankset according to claim 1, wherein said cam comprises a threaded portion, adapted to be screwed inside a housing of the cycle to be able to pivot around the crank axis.

* * * * *